(12) United States Patent
Ristoski et al.

(10) Patent No.: US 11,593,419 B2
(45) Date of Patent: Feb. 28, 2023

(54) USER-CENTRIC ONTOLOGY POPULATION WITH USER REFINEMENT

(71) Applicant: International Business Machines Corporation, Armonk, NY (US)

(72) Inventors: Petar Ristoski, San Jose, CA (US); Anna Lisa Gentile, San Jose, CA (US); Daniel Gruhl, San Jose, CA (US); Alfredo Alba, Morgan Hill, CA (US); Chris Kau, Mountain View, CA (US); Chad DeLuca, Morgan Hill, CA (US); Linda Kato, San Jose, CA (US); Ismini Lourentzou, Urbana, IL (US); Steven R. Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 16/141,845

(22) Filed: Sep. 25, 2018

(65) Prior Publication Data

US 2020/0097602 A1    Mar. 26, 2020

(51) Int. Cl.
| | |
|---|---|
| *G06F 16/36* | (2019.01) |
| *G06N 3/04* | (2023.01) |
| *G06N 3/08* | (2023.01) |
| *G06F 40/30* | (2020.01) |
| *G06F 40/295* | (2020.01) |

(52) U.S. Cl.
CPC ......... *G06F 16/367* (2019.01); *G06F 40/295* (2020.01); *G06F 40/30* (2020.01); *G06N 3/0427* (2013.01); *G06N 3/0454* (2013.01); *G06N 3/08* (2013.01)

(58) Field of Classification Search
CPC ...... G06F 16/367; G06F 40/295; G06F 40/30; G06N 3/0427; G06N 3/0454; G06N 3/08
See application file for complete search history.

(56) References Cited

U.S. PATENT DOCUMENTS

| | | |
|---|---|---|
| 7,912,826 B2 | 3/2011 | Hosokawa |
| 8,429,179 B1 | 4/2013 | Mirhaji |
| 8,799,265 B2 | 8/2014 | Johnson et al. |
| 2002/0078090 A1 | 6/2002 | Hwang et al. |
| 2004/0122705 A1 | 6/2004 | Sabol |
| 2012/0143881 A1 | 6/2012 | Baker |

(Continued)

OTHER PUBLICATIONS

Zhu et al., B-CNN: Branch Convolutional Neural Network for Hierarchical Classification, Oct. 2017. (Year: 2017).*

(Continued)

*Primary Examiner* — Kamran Afshar
*Assistant Examiner* — Marshall L Werner
(74) *Attorney, Agent, or Firm* — Sherman IP LLP; Kenneth L. Sherman; Steven Laut

(57) ABSTRACT

One embodiment provides a method that includes determining candidate ontologies for alignment from multiple available knowledge bases. An initial target ontology is selected from the candidate ontologies and correcting the initial selected ontology with received refinement input. Concepts in the selected initial ontology are aligned with concepts of the target ontology using a deep learning hierarchical classification with received review input. A user is assisted to build, change and grow the selected initial ontology exploiting both the target ontology and new facts extracted from unstructured data.

20 Claims, 10 Drawing Sheets

(56) References Cited

U.S. PATENT DOCUMENTS

2014/0222742 A1  8/2014  Peltek
2017/0046618 A1  2/2017  Peltek

OTHER PUBLICATIONS

Roy et al., Tree-CNN: A Hierarchical Deep Convolutional Neural Network for Incremental Learning, May 2018. (Year: 2018).*
Ruiz et al., Hierarchical Text Categorization Using Neural Networks, Information Retrieval, 5, 87-118, 2002. (Year: 2002).*
Siorpaes et al., Human Intelligence in the Process of Semantic Content Creation, Dec. 2009. (Year: 2009).*
Silla, Jr et al., A Survey of Hierarchical Classification Across Different Application Domains, Data Min Knowl Disc, 22:31-72, 2011. (Year: 2011).*
Mell, P., et al., "The NIST Definition of Cloud Computing", National Institute of Standards and Technology Special Publication 800-145, Sep. 2011, pp. 1-7, U.S. Department of Commerce, United States.
Nuzzolese, A.G. et al., "Type inference through the analysis of Wikipedia links," Linked Data on the Web (LDOW), Apr. 2012, pp. 1-9, France.
Nuzzolese, A.G. et al., "Open knowledge extraction challenge," In Semantic Web Evaluation Challenge, Oct. 2015, pp. 3-15. Springer International Publishing, United States.
Gangemi, A. et al., "Automatic Typing of DBpedia Entities," Int'l Semantic Web Conference—ISWC, Nov. 11, 2012, pp. 65-81, Springer, Berlin, Germany.
Gangemi, A., et al., "Framester: A wide coverage linguistic linked data hub," In Knowledge Engineering and Knowledge Management: 20th International Conference, EKAW2016, Nov. 19-23, 2016, pp. 239-254. Springer, Bologna, Italy (Abstract Only}.
Gangemi, A., et al., "Semantic web machine reading with FRED," 2016, pp. 1-21, IOS Press, United States.
Melo, A., et al., "Local and global feature selection for multilabel classification with binary relevance," Artificial Intelligence Review, 2017, pp. 1-28, United States.
Melo, A., et al., "Type prediction in RDF knowledge bases using hierarchical multilabel classification," In Proceedings of the 6th International Conference on Web Intelligence, Mining and Semantics, Jun. 13, 2016, p. 1-10, ACM.
Melo, A., et al., "Type prediction in noisy RDF knowledge bases using hierarchical multilabel classification with graph and latent features," International Journal on Artificial Intelligence Tools 26.02, Apr. 2017, pp. 1-32, United States.
Moro, A. et al., Entity Linking meets Word Sense Disambiguation: a Unified Approach, Transactions of the Association for Computational Linguistics (TACL), 2014, pp. 231-244, United States.
Aprosio, A.P. et al., "Automatic expansion of DBpedia exploiting Wikipedia cross-language information," In Extended Semantic Web Conference, 2013, pp. 397-411. Springer, Berlin, Germany.
Giuliano, C. et al., "Instance-based ontology population exploiting named-entity substitution," In Proceedings of the 22nd International Conference on Computational Linguistics—vol. 1, Aug. 2008, pp. 265-272. Association for Computational Linguistics, Manchehster, UK.
Yogatama, D. et al., "Embedding methods for fine grained entity type classification," In Proceedings of the 53rd Annual Meeting of the Association for Computational Linguistics and the 7th International Joint Conference on Natural Language Processing, Jul. 2015, pp. 291-296, 2015, vol. 2, Beijing, China.
Paulheim, H. et al., "Type inference on noisy RDF data," In International Semantic Web Conference, Oct. 2013, pp. 510-525. Springer, Berlin, Germany.
Paulheim, H. "Browsing linked open data with auto complete," 2012, pp. 1-7, Germany.
Tanev, H. et al., "Weakly supervised approaches for ontology population," In 11th Conference of the European Chapter of the Association for Computational Linguistics, 2006, pp. 17-24, United States.
Neville, J. et al., "Iterative classification in relational data," In Proc. AAAI-2000 Workshop on Learning Statistical Models from Relational Data, Jul. 2000, pp. 13-20, AAA1, United States.
Volker, J. et al., "Statistical schema induction," In Extended Semantic Web Conference, May 2011, pp. 124-138, Springer, Berlin, Heidelberg.
Dong, L. et al., "A hybrid neural model for type classification of entity mentions," Proceedings of the Twenty-Fourth International Joint Conference on Artificial Intelligence, Jul. 2015, pp. 1243-1249, AAAI, United States.
Zhang, L., et al., X-LISA: cross-lingual semantic annotation. Proceedings of the VLDB Endowment, Aug. 2014, p. 1693-1696, vol. 7, No. 13, Hangzhou, China.
Yosef, M.A., et al., "Hyena: Hierarchical type classification for entity names," Proceedings of COLING, Dec. 2012, p. 1361-1370, Mumbai.
Kejriwal, M. et al., "Supervised typing of big graphs using semantic embeddings," Proceedings of the International Workshop on Semantic Big Data, Mar. 22, 2017, pp. 1-6, arXiv preprint arXiv:1703.07805, ACM, United States.
Zhang, M.-L., "Lift: Multi-label learning with label-specific features," Jan. 2015, pp. 1609-1614, AAAI, United States.
Nakashole, N. et al., "Fine-grained semantic typing of emerging entities," Proceedings of the 51st Annual Meeting of the Association for Computational Linguistics (vol. 1: Long Papers), Aug. 2013, pp. 1488-1497, Sofia, Bulgaria.
Cimiano, P. et al., "Towards large-scale, open-domain and ontology-based named entity classification," In Proceedings of the International Conference on Recent Advances in Natural Language Processing (RANLP), 2005, pp. 1-7, United States.
Mendes, P. N. et al., "DBpedia spotlight: shedding light on the web of documents," In Proceedings of the 7th international conference on semantic systems, Sep. 2011, pp. 1-8. ACM, United States.
Ristoski, P. et al., "Large-scale Taxonomy Induction using Entity and Word Embeddings," Proceedings of the International Conference on Web Intelligence, Aug. 2017, pp. 81-87, ACM, United States {Abstract Only}.
Velardi, P. et al., "Evaluation of OntoLearn, a methodology for automatic learning of domain ontologies," Ontology Learning from Text: Methods, evaluation and applications, 2005, pp. 1-15, 123:92, IOS Press, United States.
Velardi, P. et al., "OntoLearn reloaded: A graph-based algorithm for taxonomy induction," Computational Linguistics, 2013, pp. 665-707, v. 39, issue 3, The MIT Press Journals, United States.
Shimaoka, S. et al., "An attentive neural architecture for fine-grained entity type classification," arXiv preprint arXiv:1604.05525, 2016, pp. 1-6, United States.
Shimaoka, S. et al. "Neural architectures for fine-grained entity type classification," arXiv preprint arXiv:1606.01341, 2016, pp. 1-10, United States.
Ren, X., et al., "Automatic entity recognition and typing in massive text corpora," In Proceedings of the 25th International Conference Companion on World Wide Web, Apr. 2016, pp. 1025-1028. International World Wide Web Conferences Steering Committee, United States.
Ren, X., et al., "AFET: Automatic fine-grained entity typing by hierarchical partial-label embedding," In Proc. of the Conf. on Empirical Methods in Natural Language Processing (EMNLP), 2016, pp. 1369-1378, United States.
MA,Y. et al., Typifier: Inferring the type semantics of structured data. In Data Engineering (ICDE), 2013 IEEE 29th International Conference on, Apr. 2013, pp. 206-217. IEEE, United States {Abstract Only}.
Yaghoobzadeh, Y et al., "Corpus-level fine-grained entity typing using contextual information," arXiv preprint arXiv:1606.07901, Jun. 25, 2016, pp. 1-12, United States.
Yaghoobzadeh, Y et al., "Noise mitigation for neural entity typing and relation extraction," arXiv preprint arXiv:1612.07495, Dec. 222, 2016, pp. 1-12, United States.
Ling, X. et al., "Fine-grained entity recognition," Proceedings of the Twenty-Sixth AAAI Conference on Artificial Intelligence, 2012, pp. 94-100, vol. 12, AAAI, United States.

(56) References Cited

OTHER PUBLICATIONS

{Grace Period Disclosure}: Clarkson, K. et al., "User-Centric Ontology Population," In: ESWC 2018, Jun. 3-7, 2018, pp. 1-15, Springer, Heraklion, Greece, download: https://2018.eswc-conferences.org/wp-content/uploads/2018/02/ESWC2018_paper_10.pdf.

* cited by examiner

USER-CENTRIC ONTOLOGY POPULATION WITH USER REFINEMENT

STATEMENT REGARDING PRIOR DISCLOSURES BY THE INVENTOR OR A JOINT INVENTOR

The following disclosure is submitted under 35 U.S.C. 102(b)(1)(A): DISCLOSURE: User-Centric Ontology Population, Kenneth Clarkson, Anna Lisa Gentile, Daniel Gruhl, Petar Ristoski, Joseph Terdiman, and Steve Welch, Jun. 3-7, 2018, ESWC 2018, Heraklion, Greece. Springer, 2018.

BACKGROUND

Maintaining structured machine-readable data allows easy data sharing between people and software agents, data reuse, data analysis and data use. Therefore, converting unstructured data, such as natural language text, or tweets, into a structured knowledge base is a crucial step in many applications. There are many tools that extract named entities or lexicon items of interest for the users from free text. In some cases the extracted instances are maintained in a simple form, such as a flat lexicons, but in many cases a richer structural concept organization is needed. Ontologies are often used to represent rich machine-readable semantic knowledge. While they are a great way to formalize and share knowledge, there are very few domains where the conceptualization is unique: depending on the field, on the task at end and on the specific user, the representations and organizations can vary, while still being all correct (e.g., is a tomato a fruit or a vegetable). Moreover, any representation is subject to changes over time. However, to take advantage of any existing ready available knowledge, it is necessary to be able to connect the representation at hand to any existing and well defined ontology in the field. Once done, you can take advantage and reuse any available "facts" and enable interconnection across different applications. The challenge is to populate and maintain the user ontology with both relevant facts already available in structured form (other ontologies) as well as extracting new facts from unstructured data.

SUMMARY

Embodiments relate to creating user-centric ontology population with user refinement. One embodiment provides a method that includes determining candidate ontologies for alignment from multiple available knowledge bases. An initial target ontology is selected from the candidate ontologies and correcting the initial selected ontology with received refinement input. Concepts in the selected initial ontology are aligned with concepts of the target ontology using a deep learning hierarchical classification with received review input. A user is assisted to build, change and grow the selected initial ontology exploiting both the target ontology and new facts extracted from unstructured data.

These and other features, aspects and advantages of the present embodiments will become understood with reference to the following description, appended claims and accompanying figures.

DETAILED DESCRIPTION

Figure 1:
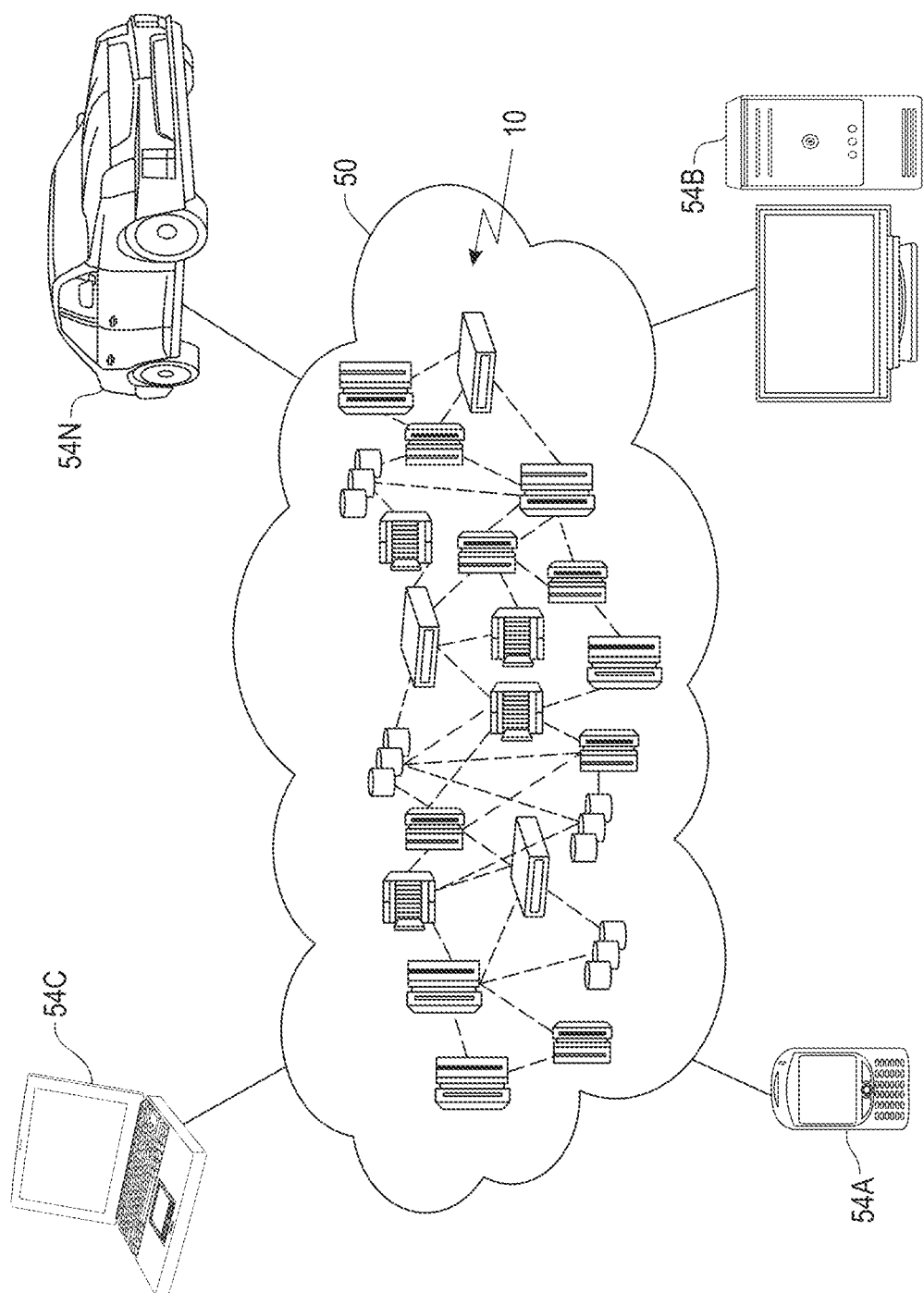
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Embodiments relate to creating user-centric ontology population with user refinement. One embodiment provides a method that includes determining candidate ontologies for alignment from multiple available knowledge bases. An initial target ontology is selected from the candidate ontologies and correcting the initial selected ontology with received refinement input. Concepts in the selected initial ontology are aligned with concepts of the target ontology using a deep learning hierarchical classification with received review input. A user is assisted to build, change and grow the selected initial ontology exploiting both the target ontology and new facts extracted from unstructured data.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
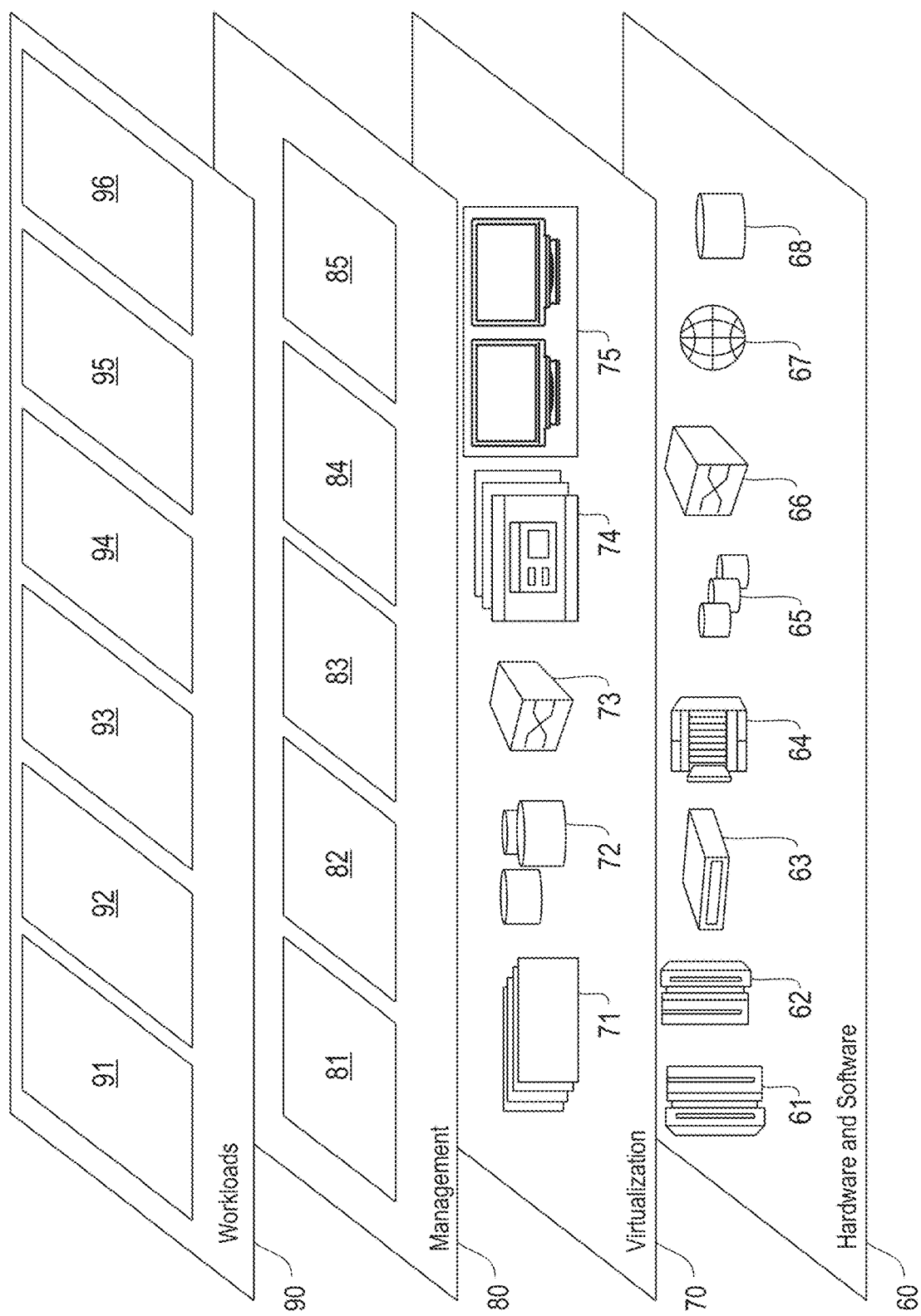
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, a management layer 80 can provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources can comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and creating user-centric ontology population with user refinement processing 96. As mentioned above, all of the foregoing examples described with respect to FIG. 2 are illustrative only, and the embodiments are not limited to these examples.

It is understood all functions of one or more embodiments as described herein can be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments can be implemented with any type of clustered computing environment now known or later developed.

Figure 3:
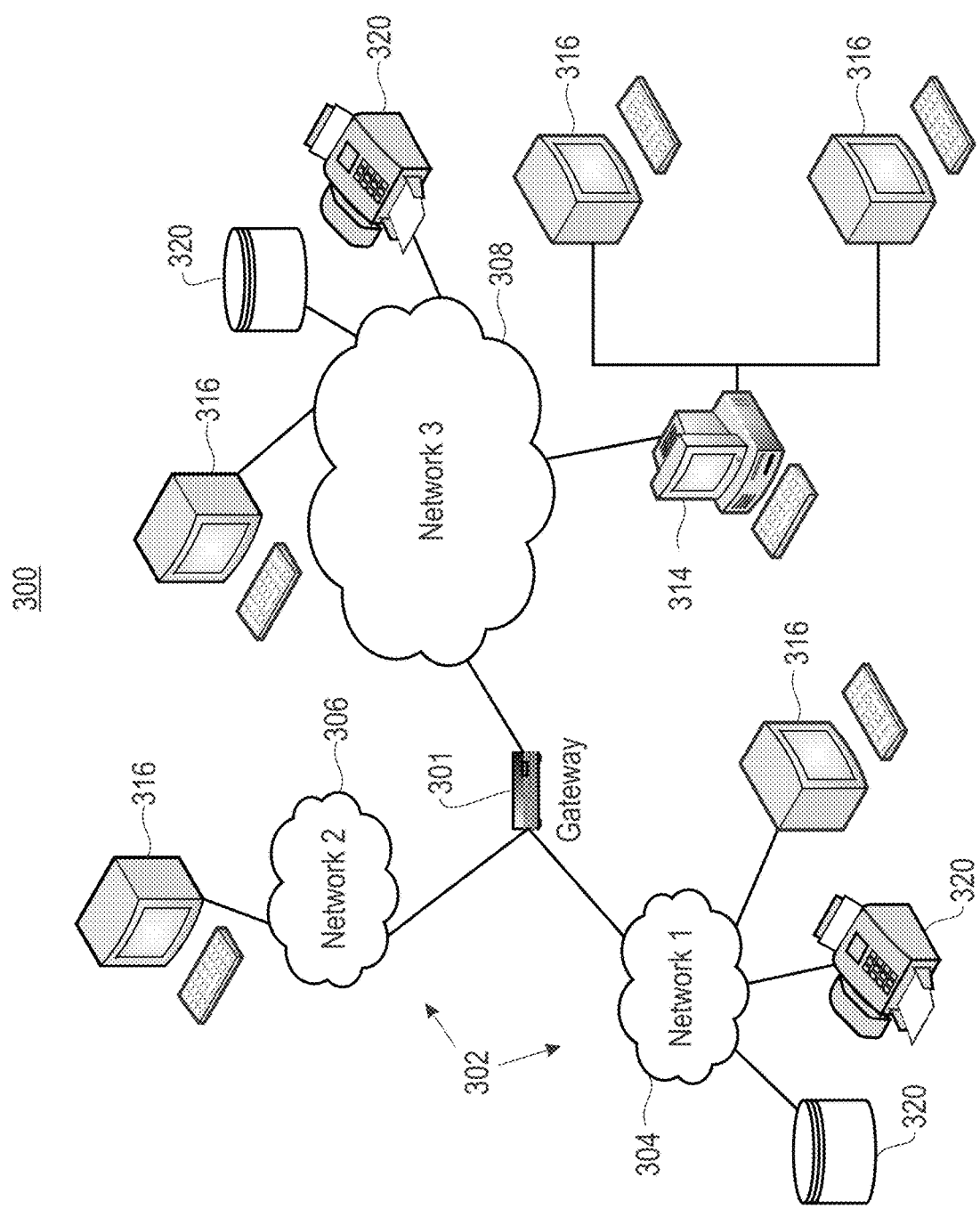
FIG. 3 is a network architecture for creating user-centric ontology population with user refinement, according to an embodiment.

FIG. 3 is a network architecture of a system for creating user-centric ontology population with user refinement, in accordance with one embodiment. As shown in FIG. 3, a plurality of remote networks 302 are provided, including a first remote network 304 and a second remote network 306. A gateway 301 can be coupled between the remote networks 302 and a proximate network 308. In the context of the present network architecture 300, the networks 304, 306 can each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 can function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 can include any type of computing device/groupware. Coupled to each data server 314 is a plurality of user devices 316. Such user devices 316 can include a desktop computer, laptop computer, handheld computer, printer, and/or any other type of logic-containing device. It should be noted that a user device 316 can also be directly coupled to any of the networks in some embodiments.

A peripheral 320 or series of peripherals 320, e.g., facsimile machines, printers, scanners, hard disk drives, networked and/or local storage units or systems, etc., can be coupled to one or more of the networks 304, 306, 308. It should be noted that databases and/or additional components can be utilized with, or integrated into, any type of network element coupled to the networks 304, 306, 308. In the context of the present description, a network element can refer to any component of a network.

According to some approaches, methods and systems described herein can be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation can be implemented through the use of VMWARE software in some embodiments.

Figure 4:
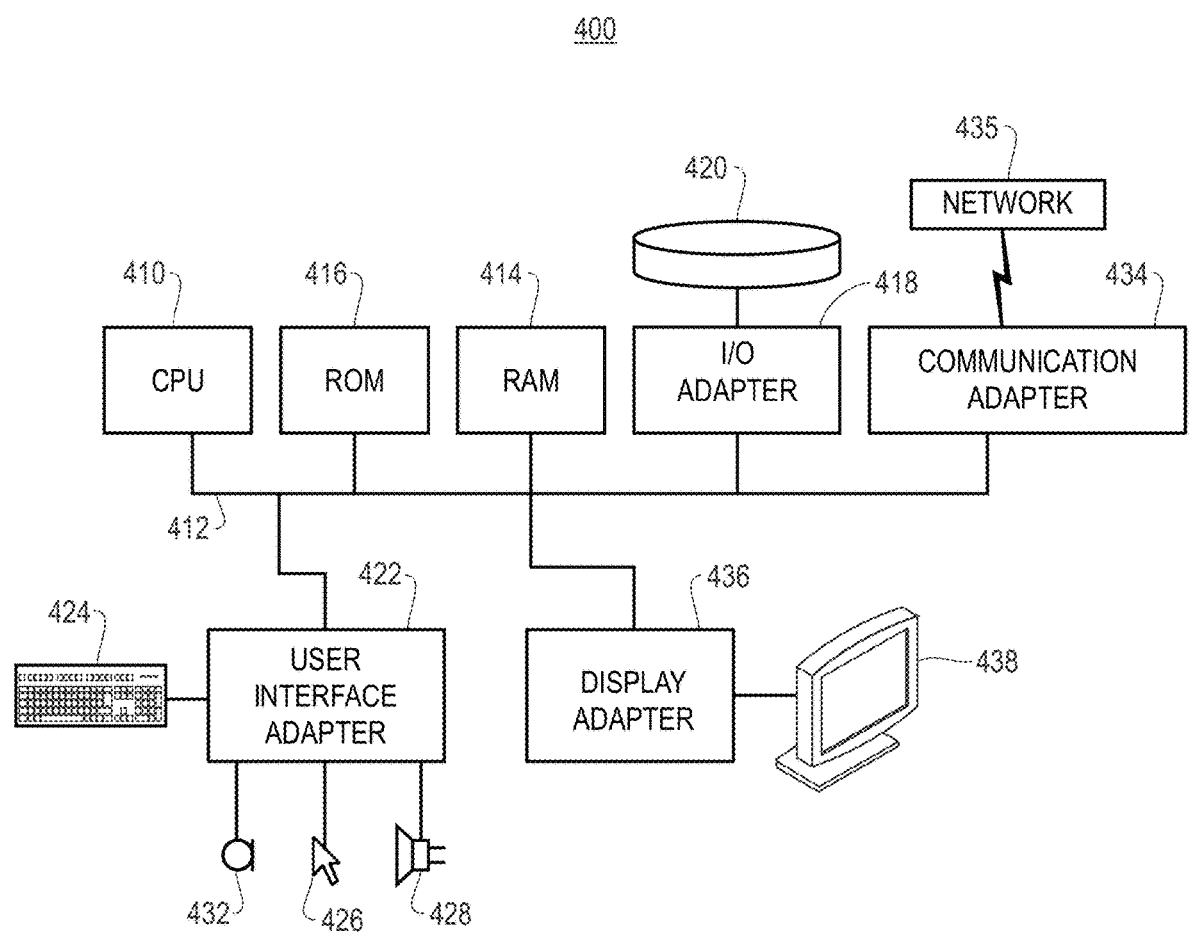
FIG. 4 shows a representative hardware environment that can be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 can include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation can have resident thereon an operating system, such as the MICROSOFT WINDOWS Operating System (OS), a MAC OS, a UNIX OS, etc. In one embodiment, the system 400 employs a POSIX® based file system. It will be appreciated that other examples can also be implemented on platforms and operating systems other than those mentioned. Such other examples can include operating systems written using JAVA, XML, C, and/or C++ language, or other programming languages, along with an object oriented programming methodology. Object oriented programming (OOP), which has become increasingly used to develop complex applications, can also be used.

Figure 5:
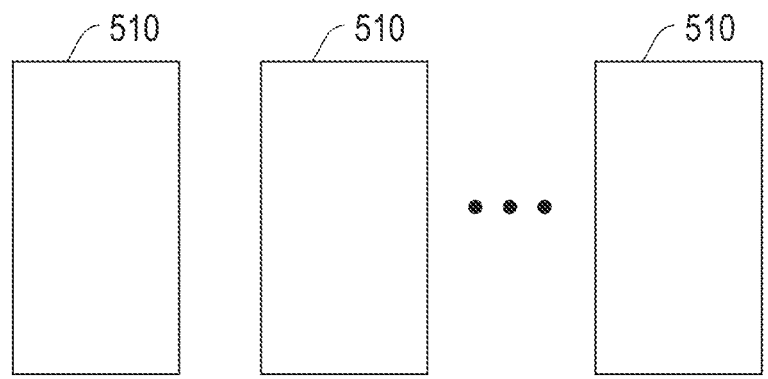
FIG. 5 is a block diagram illustrating a distributed system that can be employed for creating user-centric ontology population with user refinement, according to one embodiment.
Figure 5:
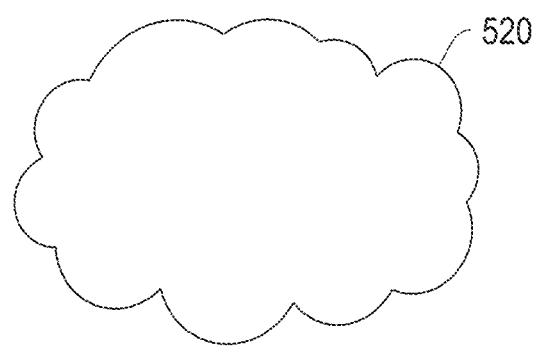
Figure 5:
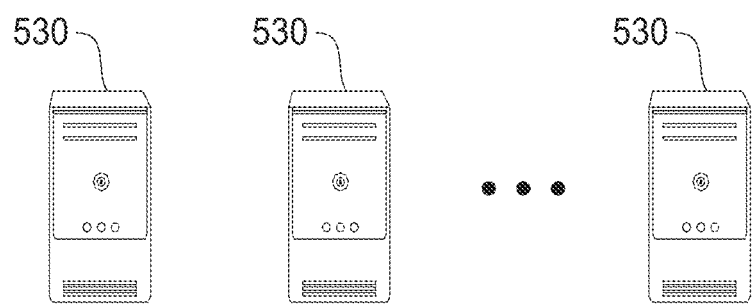

FIG. 5 is a block diagram illustrating a distributed system 500 that can be employed for creating user-centric ontology population with user refinement, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

Most conventional ontology population systems focus on general domains where perfect performance is not crucial. It has been shown that most artificial intelligent (AI) systems top out at around 80% accuracy. In many real world business domains this is not sufficient, where near perfect performances are required. Further, none of the conventional systems take into consideration the hierarchical structure of the ontology, and for all of them the number of types is relatively small and within a general open domain. In one embodiment, system 500 includes processing to address the accuracy issue with an ontology population approach that includes human-in-the-loop refinement in each step: the user is assisted to build, connect and maintain their conceptualization of the domain they are modeling. In one embodiment, given initial user data, i.e., a number of concepts and their initial instances, system 500 supports three main processing steps: (i) finding candidate ontologies for the alignment from a pool of available knowledge bases, either publicly available (e.g., the Linked Open Data cloud) or within an enterprise network and selecting the relevant ontologies (target ontologies); (ii) aligning the concepts in the user ontology with concepts of target ontologies, using deep learning hierarchical classification described below; (iii) assisting the user to build (create new concepts), change (splitting/merging concept) and grow (adding new instances to each concept) their initial ontology exploiting both the target ontologies and new facts extracted from unstructured data. Each step includes human-in-the-loop refinement: in one embodiment system 500 provides processing designed to efficiently assist the user rather than fully automate the process. The user has full control on his level of involvement, with a trade-off on the accuracy of results: the more precise and granular the representation needs to be, the more they can get in the loop.

Figure 6:
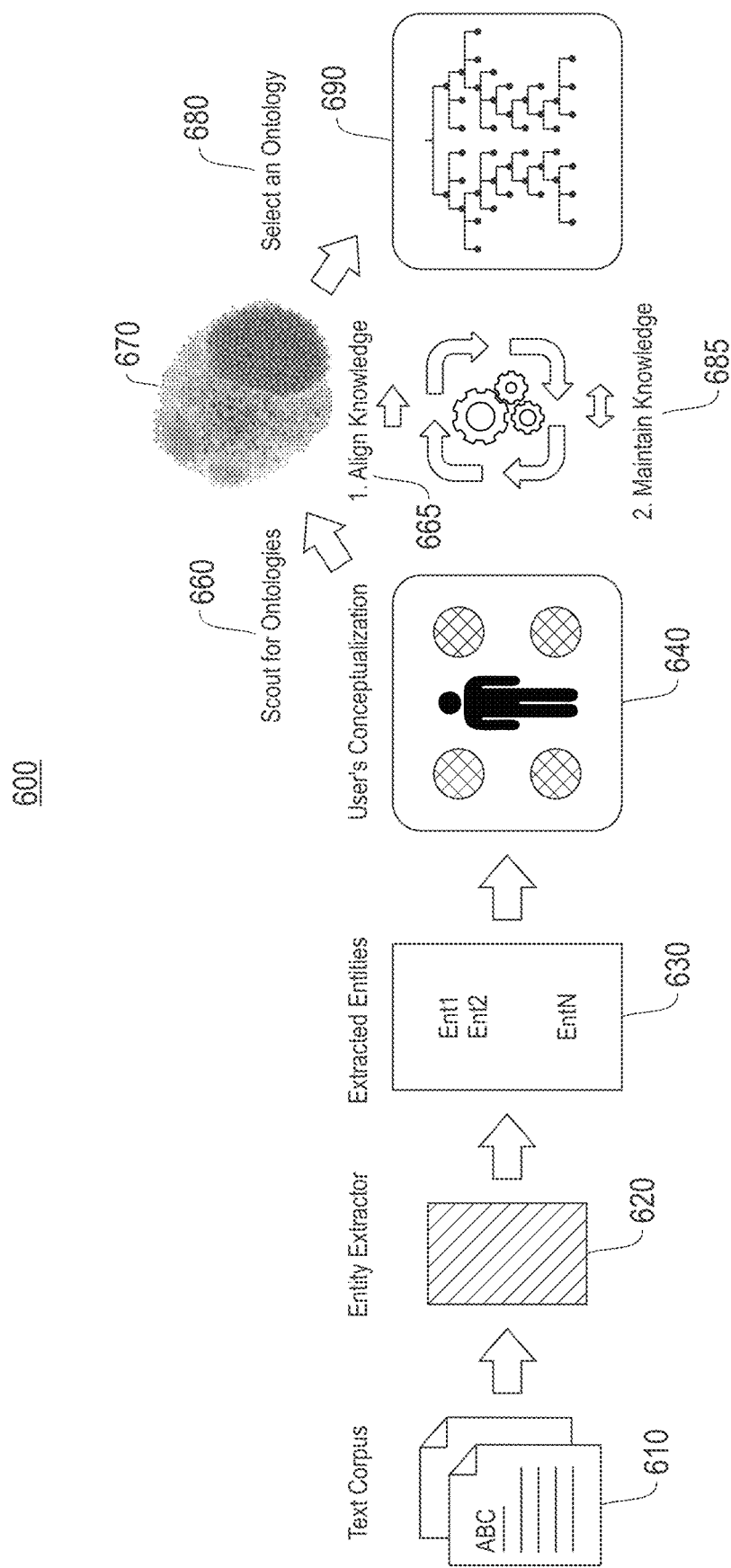
FIG. 6 illustrates an architecture of a system for creating user-centric ontology population with user refinement, according to one embodiment.

FIG. 6 illustrates an architecture of a system 600 for creating user-centric ontology population with user refinement, according to one embodiment. In one embodiment, system 600 supports three main processing steps of knowledge representation: (i) scout for ontologies 660 (for ontology candidates 670) that can fit user data; (ii) align knowledge 665 of the user's organization of concepts with the selected target ontology(/ies) 690; (iii) maintain knowledge 685 (the user knowledge base) by providing functions for adding new instances, splitting or merging concepts and creating new concepts. Human-in-the-loop is supported in each processing step: the system 600 assists the user in performing knowledge management actions in an easy and efficient way, rather than fully automating the process.

In one embodiment, one or more text corpus 610 are obtained by the system 600 (e.g., from the Web, databases, networks, etc.), and the input for processing by system 600 includes a set of extracted entities 630 within a particular domain, extracted by the entity extractor 620 from a coherent textual corpus 610. Given a textual corpus 610, the (domain) entity extractor 620 (e.g., SPOT) that produces the set of relevant extracted entities 630 in the corpus $I_U = i_1, i_2, \ldots, i_n$. In one embodiment, a user refines this set by organizing all instances in $I_U$ in concepts at user's conceptualization 640. The result is a finite set of user-defined concepts $C_u = c_{u1}, c_{u2}, \ldots, c_{un}$ where each concept contains at least one instance. Using the user-defined conceptualization $C_u$, system 600 scouts for ontologies 660 (ontology candidates) that can fit the user data.

In one embodiment, after a target ontology $C_T$ is selected (at select an ontology 680), system 600 has a goal of aligning $C_u$ to $C_T$. The alignment at align knowledge 665 is performed at different granularity: given the depth L (or number of levels from root to leaves) of the target ontology, the user can specify the desired level for the alignment, and system 600 uses, as target concepts, all concepts $I_{CT} = c_{ct1}, c_{ct2}, \ldots, c_{ctm}$ at level l. In one embodiment, once the initial alignment is completed, the maintenance of user knowledge at maintain knowledge 685 is supported by providing functions for adding new instances, splitting or merging concepts and creating new concepts. System 600 identifies available knowledge using simple collective instance matching between user data and a repository of ontologies. From the repository, either publicly available (such as the Linked Open Data cloud) or proprietary, the top N matching ontologies are presented to the user, who chooses a target ontology $C_T$. This processing can be performed using many alternative state-of-the-art methods in system 600 this is considered as given, and the focus is on the alignment by align knowledge 665.

In one embodiment, for scout for ontologies 660 (scouting for available knowledge) collective instance matching between user data and a repository of ontologies is used to identify suitable ontologies for maintaining the user organization of concepts. The approach by system 600 works with publicly available repositories, such as the Linked Open Data cloud, or proprietary enterprise repositories. System 600 proposes top-N ontologies to the user that might be suitable for the given data. Once the user has selected the target ontology(/ies), the alignment from user to target models is performed by align knowledge 665. In one embodiment, two machine learning approaches are used. Considering the user data as "new instances" both machine learning approaches attempt to identify the concepts in the target ontologies that represent the best match exploiting domain specific word embeddings as features. In the first solution, a flat hierarchical classification (see, e.g., FIG. 7A) is performed: a deep convolutional neural network classifier is built for each level of the hierarchy of the target ontology, considering the nodes of each level as classes, and using the corresponding leaves as instances. This model shows high performances in the upper levels of the hierarchy. However, in the lower level of the ontology, when the number of classes rapidly increases, the complexity of the model rises and the performance drops. The second solution is a top-down, per-node local classifier (see, e.g., FIG. 7B). A deep convolutional neural network classifier is built for each node (apart from leaves) in the hierarchy: all children nodes are considered as classes for the model, and their corresponding leaves as instances (to train the model). This approach can easily cope with large number of classes in the lower parts of the hierarchy.

As for matching techniques used within the alignment models, in one embodiment system 600 allows to plug-and-play any state-of-the-art matching selected by the user, e.g., string-based, word embedding, labeled Latent Dirichlet Allocation (LDA), edit distance, etc. The deep learning models can also be substituted with some of the standard machine learning models, such as Support Vector Machines (SVM), Naive Bayes, Logistic Regression, Random Forest, etc. The user is able to select the most suitable approach for the given domain and task at hand, that is, the one that offers the best trade-off between complexity, runtime and performances for the given dataset and task. In one embodiment, a user can define their level of involvement by defining a confidence threshold for each level in the hierarchy: whenever the confidence of the approach is below the given threshold, system 600 displays top-N candidates to the user who can manually select the desired alignment.

In one embodiment, system 600 exposes several actions for maintaining the created knowledge base at maintain knowledge 685: (i) adding new instances in the user defined concepts; and ii) outlier detection to identify instances that do not fit into the user predefined concepts. In such cases, system 600 informs the user about the outlier and provides top-N concepts from the target ontology that might be suitable (using the hierarchical alignment strategy). Additionally, action (iii) provides identification of concepts to be split: using the same outlier detection processing, system 600 proposes the user to split some of the concepts into two (2), or multiple concepts, and for each of them proposes new concepts from the ontology; and action (iv) identification of concepts to be merged into one concept. These functions have been shown to be of a high importance, because in many cases the definition of the concepts or the user's "vision of the world" can evolve over time.

In one embodiment, three machine learning approaches for hierarchical classification are implemented in system 600. Considering the user data as "new instances," the three machine learning approaches attempt to identify the concepts in the target ontologies that represent the best match. To do so, system 600 builds machine learning models that use the instances of the target ontology as training data (completely unsupervised), and exploit domain-specific word embeddings as features.

Figure 7A:
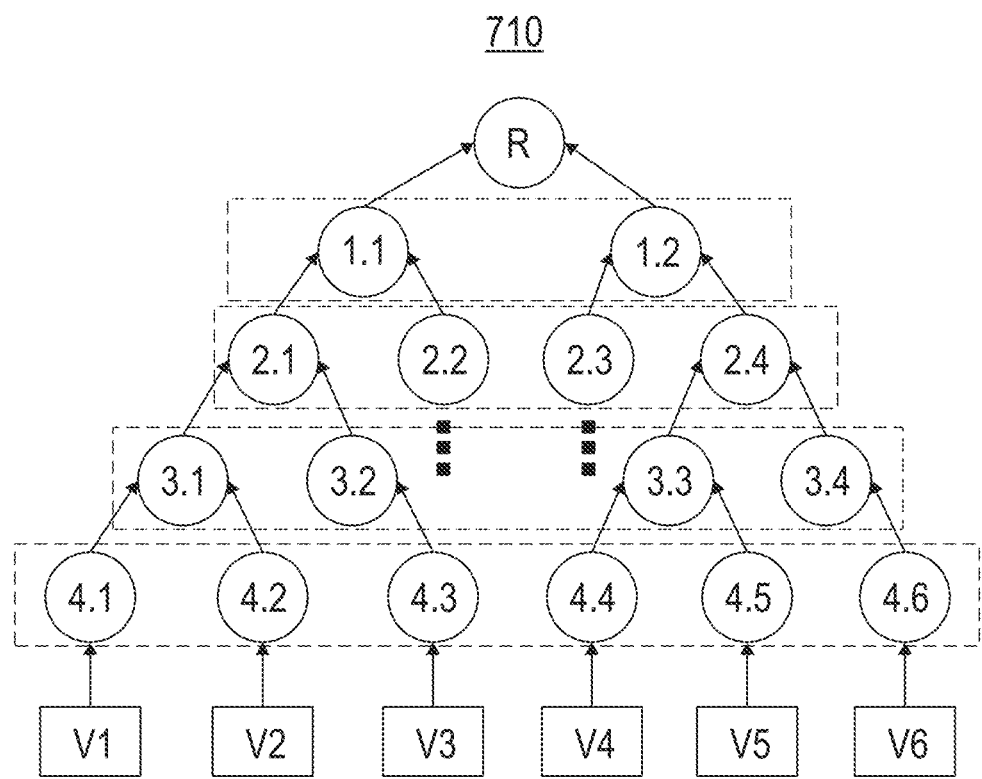
FIG. 7A illustrates an architecture for a machine learning approach for flat hierarchical classification, according to one embodiment.

FIG. 7A illustrates an architecture for a machine learning approach 710 for flat hierarchical classification, according to one embodiment. In one embodiment, system 600 (FIG. 6) performs a flat hierarchical classification. Given $C_u$, and considering user-chosen level l of the ontology, system 600 builds one classifier with as many classes as concepts at level l, using the leaves of each concept as instances for training the classifier. In one embodiment, the machine learning model for approach 710 achieves high performance in the upper levels of the hierarchy. However, in the lower levels of the ontology, when the number of classes rapidly increases, the complexity of the learning model for approach 710 rises, and the performance drops.

Figure 7B:
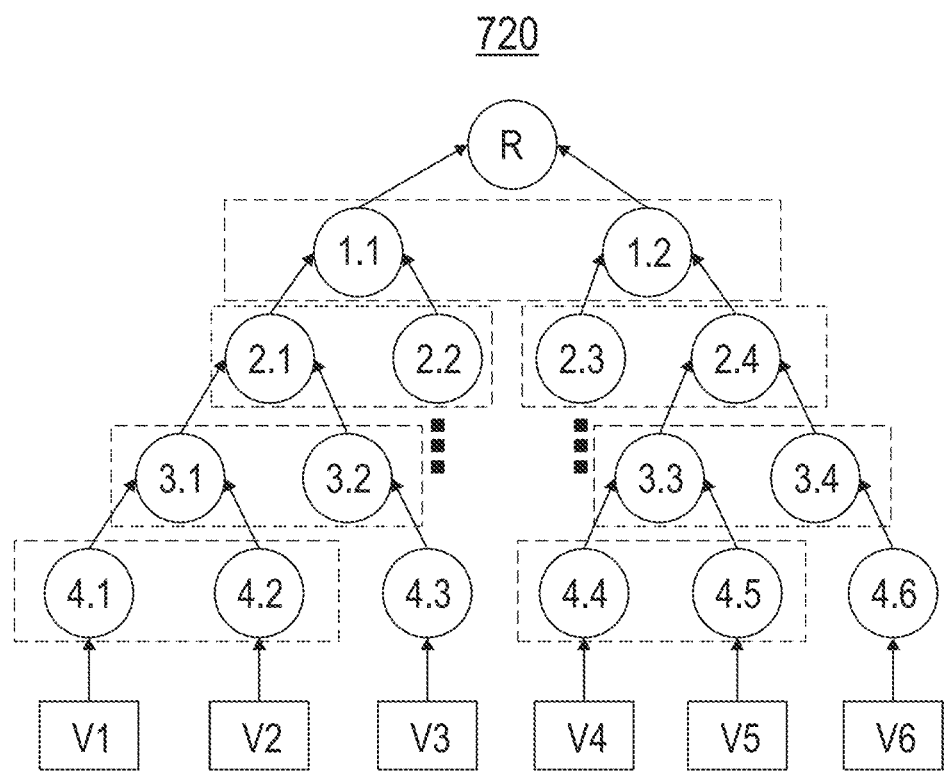
FIG. 7B illustrates an architecture for a machine learning approach for top-down per parent node hierarchical classification, according to one embodiment.

FIG. 7B illustrates an architecture for a machine learning approach 720 for top-down per parent node hierarchical classification, according to one embodiment. In one embodiment, the approach 720 is a top-down learning model, where system 600 builds a local classifier for each parent node. Given $C_u$, and considering user-chosen level l of the ontology, the approach 720 builds a classifier for each parent node, starting from the top of the hierarchy to level l–1, using all children nodes as classes, and their corresponding leaves as instances to train the learning model. The approach 720 can easily cope with a large number of classes in the lower levels of the hierarchy; however, the errors are propagated from the top to the bottom of the ontology.

Figure 7C:
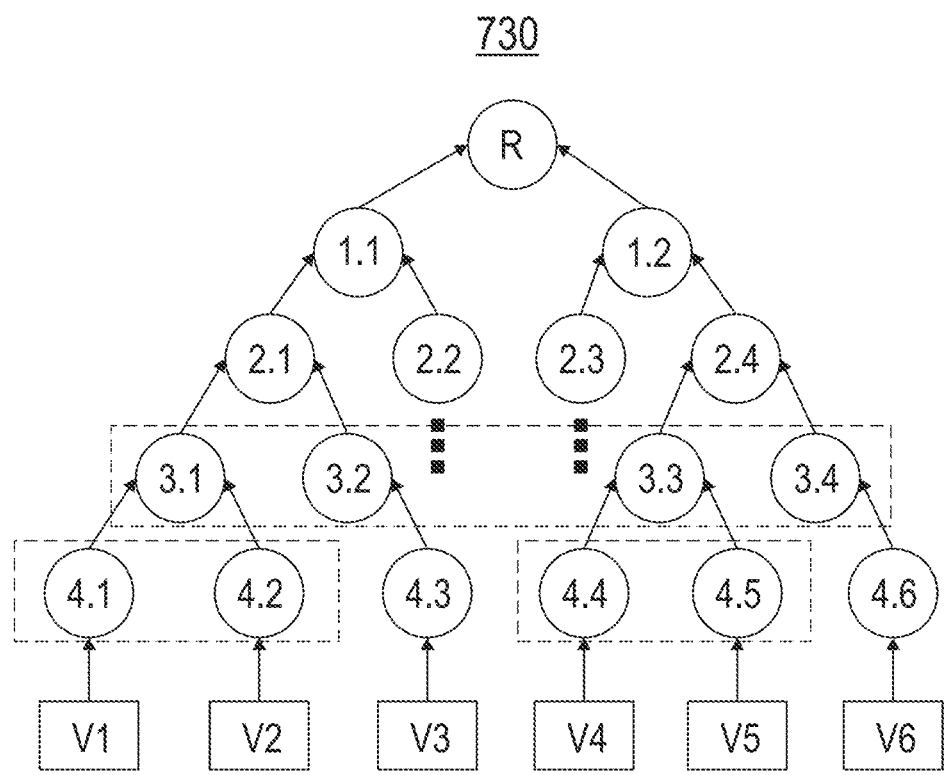
FIG. 7C illustrates an architecture for a machine learning approach for combined hierarchical classification, according to one embodiment.

FIG. 7C illustrates an architecture for a machine learning approach 730 for combined hierarchical classification, according to one embodiment. In one embodiment, to circumvent the drawbacks of approaches 710 and 720, a third hierarchical architecture for a machine learning approach 730, which is a combination of the previous two is provided. Given $C_u$, and considering user-chosen level l of the ontology, the approach 730 builds (i) a flat classifier for level l–1 of the ontology, and (ii) a classifier for each parent node at level l–1 using the concepts of the l level as classes. The approach 730 is very effective when there is a significant difference in the number of nodes between the l and l–1 level of the ontology, for two reasons: (i) the flat classifier performs well on level l–1, which has smaller number of classes; and (ii) the per-parent node classifier will only be affected by the errors propagated from the previous level, rather than from the top of the hierarchy.

Returning to FIG. 6, in one embodiment, to perform the final alignment for each user concept $c_u = i_{u1}, i_{u2}, \ldots, i_{un}$, system 600 classifies each instance of $c_u$ into concepts at target level l of the ontology, and chooses the final assignment by majority vote on all instances of $c_u$, weighting each of them by the class probability distribution returned by the classifier. In one embodiment, the user can define their level of involvement by defining a confidence threshold for each level in the hierarchy: whenever the confidence of the approach is below the given threshold, the system displays top-N candidates to the user who can manually select the desired alignment. Once the alignment has been completed, system 600 provides functions for maintaining the created knowledge base at processing for maintain knowledge 685, such as adding instances, adding new concepts and merging/splitting concepts. These functions have been shown to be of a high importance, because of the continuous need to add new data as well as to take into account changes in the user conceptualization over time.

In one embodiment, when new instances appear, system 600 uses the same processing (described above) to align them to the user's conceptualization 640. In this case, the learning models only consider the concepts defined by the user. When an instance does not fit any of the user-defined concepts, a new concept is added to the user's conceptualization 640 (with the "Adding New Concepts" function), which is then aligned (through align knowledge 665 processing) to the target ontology 690.

In one embodiment, to decide if there is a need for a new concept in the user representation, system 600 uses entropy as an uncertainty measure for the classifier's predictions. Given the class probability distribution $[P(C_1 x) \ldots P(C_k x)]$ of existing classes k, for a new instance x, for a given machine learning approach, system 600 determines that there is a need to generate a new class if the class probabilities entropy is larger than 1.0:

$$E(x) = \Sigma_{i=0}^{k} P(C_i|x) * \log_2 P(C_i|x) > 1 \qquad (1)$$

Whenever the entropy is high, system 600 informs the user that there might be the need to introduce a new concept. Using the hierarchical classification models discussed above, system 600 provides potential new candidate concepts retrieved from the target ontology 690 to the user.

In one embodiment, the action of merging concepts is as follows: if two user-defined concepts are aligned to the same target ontology concept, then the user concepts are merged.

In one embodiment, as the user conceptualization grows by adding new instances and new concepts, the user's view is also evolving, so reorganization of the instances might be required. To assist the user in this processing step, system 600 trains the hierarchical classification model on all the instances in the user's conceptualization data, and then uses the learning model to classify all the instances, according to one embodiment. By analyzing the class prediction distribution, system 600 can identify two types of candidates for reassigning: (i) Misclassifying an instance indicates that the instance might be an outlier in the currently assigned concept, implying that the instance is assigned in the current concept because of a user error; (ii) High entropy (see Equation 1) indicates that the instance might fit better in a different concept than the current one. In one embodiment, system 600 provides (e.g., via a display, messaging, etc.) the suggestions to the user to decide if the instances need to be reassigned. When instances are reassigned, the learning model is retrained on the updated conceptualization. The stopping criterion for reassignment is that there are no more updates in the concepts.

Figure 8:
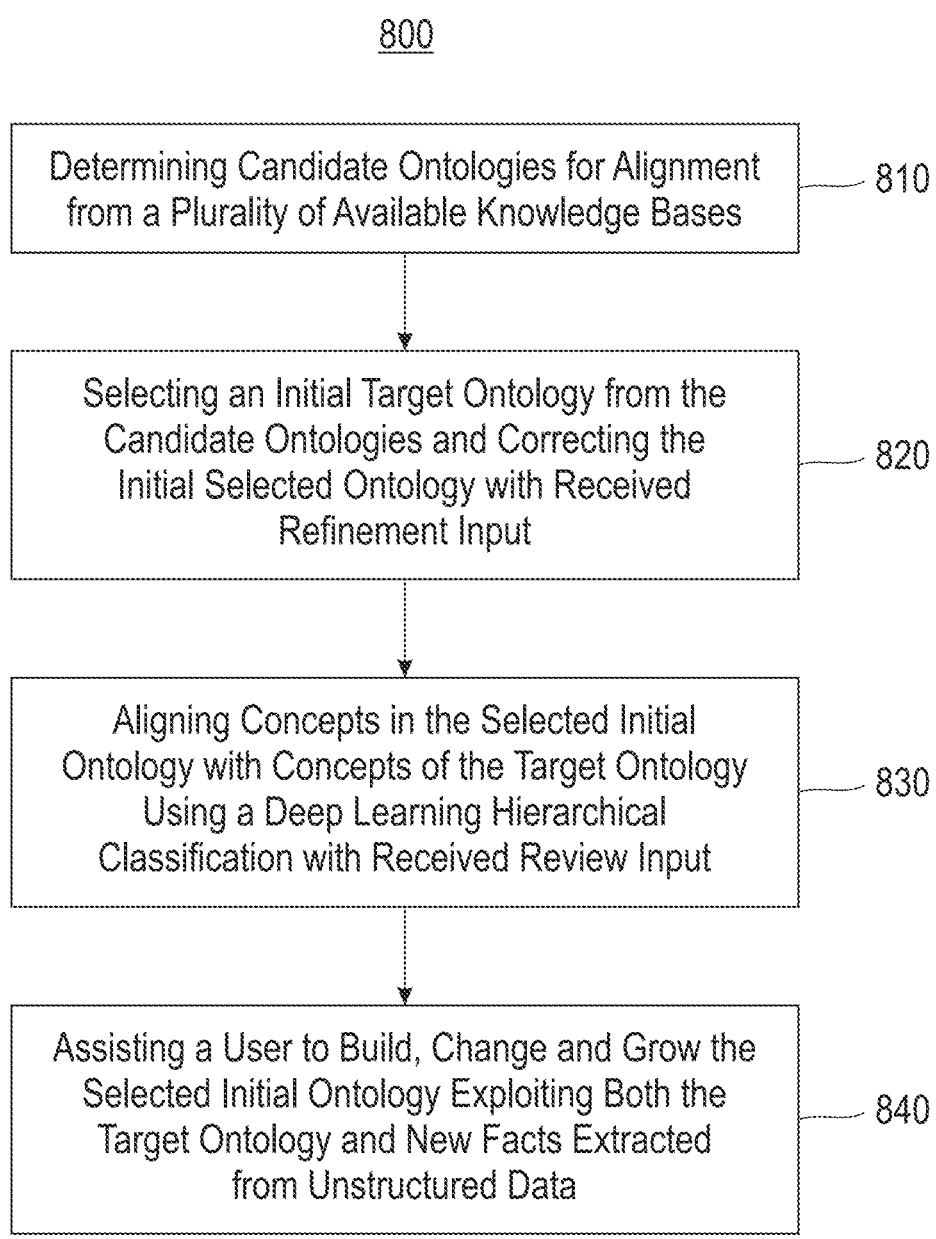
FIG. 8 illustrates a block diagram of a process for creating user-centric ontology population with user refinement, according to one embodiment.

FIG. 8 illustrates a block diagram of a process 800 for creating user-centric ontology population with user refinement, according to one embodiment. In block 810, process 800 determines candidate ontologies for alignment from multiple of available knowledge bases in a system (e.g., computing node 10, FIG. 1, processing system 300, FIG. 3, system 400, FIG. 4, system 500, FIG. 5, system 600, FIG. 6, etc.). In block 820, process 800 selects an initial target ontology from the candidate ontologies and corrects the initial selected ontology with received refinement input (e.g., from a user in-the-loop, etc.). In block 830, process 800 aligns concepts in the selected initial ontology with concepts of the target ontology using a deep learning hierarchical classification with received review input. In block 840, process 800 assists a user to build, change and grow the selected initial ontology exploiting both the target ontology and new facts extracted from unstructured data.

In one embodiment, in process 800 the multiple available knowledge bases include publicly available knowledge bases, knowledge bases within an enterprise network, etc. In one embodiment, building the selected initial ontology includes creating new concepts for the selected initial ontology. In one embodiment, changing the selected initial ontology comprises splitting or merging concepts for the selected initial ontology.

In one embodiment, in process 800 growing the selected initial ontology includes adding new instances to each concept for the selected initial ontology. In one embodiment, process 800 includes extracting a set of entities within a particular domain a coherent textual corpus including the multiple available knowledge bases.

In one embodiment, in process 800 the deep learning hierarchical classification includes: a flat hierarchical classification, a top-down, per-node local classification, and a combination of the flat hierarchical classification and the top-down, per-node local classification. In one embodiment, the flat hierarchical classification includes a first learning model with a deep convolutional neural network classifier that is built for each level of hierarchy of the target ontology, and the top-down, per-node local classification includes a second learning model with a deep convolutional neural network classifier that is built for each hierarchy node.

As will be appreciated by one skilled in the art, aspects of the present embodiments can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present embodiments can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present embodiments can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present embodiments are described below with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. A method comprising:
   receiving, by a processor, candidate ontologies for alignment from a plurality of available knowledge bases;
   receiving, by the processor, a selected and corrected initial ontology from the candidate ontologies, wherein the received initial ontology being corrected with received refinement input;
   generating, by the processor, at least one machine learning model for deep learning hierarchical classification processing;
   training, by the processor, the at least one machine learning model with instances of concepts of a target ontology;
   performing, by the processor, deep learning hierarchical classification processing using the at least one machine learning model with received review input that aligns concepts in the received initial ontology with concepts of the target ontology, wherein the deep learning hierarchical classification processing is a combination of flat hierarchical classification processing and top-down, per-node local classification processing;
   providing, by the processor, new facts extracted from unstructured data for improving the initial ontology; and
   retraining, by the processor, the at least one machine learning model with updated instances of the concepts of the target ontology.

2. The method of claim 1, wherein the plurality of available knowledge bases comprises at least one of publicly available knowledge bases or knowledge bases within an enterprise network, and the deep learning hierarchical classification processing classifies the instances of the target ontology based on class prediction distribution from reassignment of the instances of the target ontology.

3. The method of claim 2, further comprising:
   providing, by the processor, a function for creating new concepts for the initial ontology; and
   generating a new class when class probabilities entropy exceeds a threshold for existing classes.

4. The method of claim 2, further comprising providing, by the processor, a function for changing the initial ontology based on splitting or merging concepts for the initial ontology.

5. The method of claim 2, further comprising providing, by the processor, a function for growing the initial ontology based on adding new instances to each concept for the initial ontology.

6. The method of claim 1, further comprising extracting, by the processor, a set of entities within a particular domain from a coherent textual corpus that comprises the plurality of available knowledge bases.

7. The method of claim 6, wherein the flat hierarchical classification processing comprises executing the at least one machine learning model with a deep convolutional neural network classifier that is built, by the processor, for each level of hierarchy of the initial ontology.

8. The method of claim 7, wherein:
   the top-down, per-node local classification processing comprises executing another machine learning model with a deep convolutional neural network classifier that is built, by the processor, for each hierarchy node;
   nodes in a node hierarchy includes each parent node and each child node from top of the node hierarchy;
   the child nodes are used as classes; and
   corresponding leaves of the child nodes are used as the instances of the target ontology for training the at least one machine learning model and the another machine learning model.

9. A computer program product for creating user-centric ontology population, the computer program product comprising a non-transitory computer readable storage medium having program instructions embodied therewith, the program instructions executable by a processor to cause the processor to:

receive, by the processor, candidate ontologies for alignment from a plurality of available knowledge bases;

receive, by the processor, a selected and corrected initial ontology from the candidate ontologies, wherein the received initial ontology being corrected with received refinement input;

generate, by the processor, at least one machine learning model for deep learning hierarchical classification processing;

train, by the processor, the at least one machine learning model with instances of concepts of a target ontology;

perform, by the processor, deep learning hierarchical classification processing using the at least one machine learning model with received review input that aligns concepts in the received initial ontology with concepts of the target ontology, wherein the deep learning hierarchical classification processing is a combination of flat hierarchical classification processing and top-down, per-node local classification processing;

provide, by the processor, new facts extracted from unstructured data for improving the initial ontology; and retrain, by the processor, the at least one machine learning model with updated instances of the concepts of the target ontology.

10. The computer program product of claim 9, wherein the plurality of available knowledge bases comprises at least one of publicly available knowledge bases or knowledge bases within an enterprise network, and the deep learning hierarchical classification processing classifies the instances of the target ontology based on class prediction distribution from reassignment of the instances of the target ontology.

11. The computer program product of claim 10, wherein the program instructions executable by the processor further cause the processor to:

provide, by the processor, a function for creating new concepts for the initial ontology;

provide, by the processor, a function for changing the initial ontology based on splitting or merging concepts for the initial ontology; and generate, by the processor, a new class when class probabilities entropy exceeds a threshold for existing classes.

12. The computer program product of claim 10, wherein the program instructions executable by the processor further cause the processor to:

provide, by the processor, a function for growing the initial ontology based on adding new instances to each concept for the initial ontology.

13. The computer program product of claim 9, further comprising program instructions executable by the processor to cause the processor to:

extract, by the processor, a set of entities within a particular domain from a coherent textual corpus that comprises the plurality of available knowledge bases.

14. The computer program product of claim 13, wherein the flat hierarchical classification processing comprises executing the at least one machine learning model with a deep convolutional neural network classifier that is built for each level of hierarchy of the initial ontology.

15. The computer program product of claim 14, wherein: the top-down, per-node local classification processing comprises executing another machine learning model with a deep convolutional neural network classifier that is built for each hierarchy node;

nodes in a node hierarchy includes each parent node and each child node from top of the node hierarchy;

the child nodes are used as classes; and corresponding leaves of the child nodes are used as the instances of the target ontology for training the at least one machine learning model and the another machine learning model.

16. An apparatus comprising:

a memory configured to store instructions; and a processor configured to execute the instructions to:

receive candidate ontologies for alignment from a plurality of available knowledge bases;

receive a selected and corrected initial ontology from the candidate ontologies, wherein the received initial ontology being corrected with received refinement input;

generate at least one machine learning model for deep learning hierarchical classification processing;

train the at least one machine learning model with instances of concepts of a target ontology;

perform deep learning hierarchical classification processing using the at least one machine learning model with received review input that aligns concepts in the received initial ontology with concepts of the target ontology, wherein the deep learning hierarchical classification processing is a combination of flat hierarchical classification processing and top-down, per-node local classification processing;

provide new facts extracted from unstructured data for improving the initial ontology; and retrain the at least one machine learning model with updated instances of the concepts of the target ontology.

17. The apparatus of claim 16, wherein:

the plurality of available knowledge bases comprises at least one of publicly available knowledge bases or knowledge bases within an enterprise network;

the deep learning hierarchical classification processing classifies the instances of the target ontology based on class prediction distribution from reassignment of the instances of the target ontology; and the processor further configured to execute the instructions to:

providing a function for creating new concepts for the initial ontology;

providing a function for changing the initial ontology based on splitting or merging concepts for the initial ontology;

providing a function for growing the initial ontology based on adding new instances to each concept for the initial ontology; and generating a new class when class probabilities entropy exceeds a threshold for existing classes.

18. The apparatus of claim 16, wherein the processor is further configured to execute the instructions to:

extract a set of entities within a particular domain from a coherent textual corpus that comprises the plurality of available knowledge bases.

19. The apparatus of claim 18, wherein the flat hierarchical classification processing comprises executing the at least one machine learning model with a deep convolutional neural network classifier that is built for each level of hierarchy of the initial ontology.

20. The apparatus of claim 19, wherein:
the top-down, per-node local classification processing comprises executing another machine learning model with a deep convolutional neural network classifier that is built for each hierarchy node;
nodes in a node hierarchy include each parent node and each child node from top of the node hierarchy;
the child nodes are used as classes; and
corresponding leaves of the child nodes are used as the instances of the target ontology for training the at least one machine learning model and the another machine learning model.

* * * * *